(12) United States Patent
Nakamura

(10) Patent No.: US 9,365,012 B2
(45) Date of Patent: Jun. 14, 2016

(54) LABEL PRODUCTION METHOD

(75) Inventor: Hiroshi Nakamura, Osaka (JP)

(73) Assignee: WE'LL CORPORATION, Hakusan-shi (JP)

( * ) Notice: Subject to any disclaimer, the term of this patent is extended or adjusted under 35 U.S.C. 154(b) by 121 days.

(21) Appl. No.: 14/381,346

(22) PCT Filed: Mar. 2, 2012

(86) PCT No.: PCT/JP2012/055370
§ 371 (c)(1),
(2), (4) Date: Aug. 27, 2014

(87) PCT Pub. No.: WO2013/128629
PCT Pub. Date: Sep. 6, 2013

(65) Prior Publication Data
US 2015/0020962 A1    Jan. 22, 2015

(51) Int. Cl.
| | |
|---|---|
| B32B 37/02 | (2006.01) |
| B32B 37/22 | (2006.01) |
| B32B 37/26 | (2006.01) |
| B32B 38/04 | (2006.01) |
| B32B 38/10 | (2006.01) |
| B31D 1/02 | (2006.01) |
| B42D 25/40 | (2014.01) |
| B32B 38/00 | (2006.01) |
| B26F 1/40 | (2006.01) |
| B32B 38/18 | (2006.01) |

(52) U.S. Cl.
CPC . *B31D 1/026* (2013.01); *B26F 1/40* (2013.01); *B31D 1/02* (2013.01); *B32B 38/0004* (2013.01); *B32B 38/10* (2013.01); *B42D 25/40* (2014.10); *Y10T 156/108* (2015.01)

(58) Field of Classification Search
CPC ...... B31D 1/02; B31D 1/026; B32B 38/0004; B32B 38/10; Y10T 156/108; B42D 25/40; B26F 1/40
USPC .......................................... 156/250, 267, 289
See application file for complete search history.

(56) References Cited

FOREIGN PATENT DOCUMENTS

| | | |
|---|---|---|
| DE | 3441198 A1 | 5/1986 |
| JP | H09-327872 A | 12/1997 |
| JP | H10-324319 A | 12/1998 |
| JP | 2000-135750 A | 5/2000 |

(Continued)

OTHER PUBLICATIONS

English translation of JP2000135750.*

(Continued)

*Primary Examiner* — Sonya Mazumdar
(74) *Attorney, Agent, or Firm* — Typha IP LLC

(57) ABSTRACT

Provided is a label production method capable of significantly reducing production costs by producing many single labels using one member. A label substrate that an adhesive and a release agent are applied to is passed through a laminating device twice, first label substrate passed for the first time and second label substrate passed for the second time are pseudo-adhered by joining the release agent of the first label substrate passed for the first time to the adhesive of the second label substrate passed for the second time, and single labels are punched out from the second label substrate by a cutting tooth of a punching device at a position on the downstream side after the label substrate is passed through the laminating device for the second time. The first label substrate passed for the first time is used as a seat for the cutting tooth of the punching device.

8 Claims, 6 Drawing Sheets

(56) References Cited

FOREIGN PATENT DOCUMENTS

| | | |
|---|---|---|
| JP | 3205804 B2 | 7/2001 |
| WO | 2010/082533 A1 | 7/2010 |

OTHER PUBLICATIONS

International Search Report of PCT/JP2012/055370 mailed on Jun. 5, 2012.

\* cited by examiner

LABEL PRODUCTION METHOD

CROSS REFERENCES TO RELATED APPLICATIONS

This application is a 35 U.S.C. §371 national stage of International Application Serial Number PCT/JP2012/055370 filed on Mar. 2, 2012, the entire contents of which are hereby incorporated by reference.

TECHNICAL FIELD

The present invention relates to a method for producing labels to be stuck to an adherend such as a bottle.

BACKGROUND ART

In general, a label to be stuck to an adherend such as an article conventionally includes a label substrate having a printed surface and an adhesive applied to the reverse side of the label substrate. A method for producing such conventional adhesive-applied labels to be stuck to the adherend is described in reference to FIG. 5. For producing the labels, an adhesive label base sheet 56 composed of two members, or a paper liner (back substrate) 50 having a release agent applied to the surface and a label substrate 54 having an adhesive 52 applied to the reverse side, is used. In the adhesive label base sheet 56, the label substrate 54 is temporarily adhered through the adhesive 52 to the release agent-applied surface of the paper liner 50, and the label substrate 54 that is one member in the adhesive label base sheet 56 with the temporarily adhered two members is subjected to printing and punching (half-punching of only the label substrate 54 with the adhesive 52).

When only the label substrate 54 with the adhesive 52 is half-punched from the adhesive label base sheet 56, for example, a rotary cutting machine 58 provided with cutting teeth 57 is disposed on the label substrate 54 side of the adhesive label base sheet 56, and a cylindrical seat (anvil roll) 60 is disposed on the paper liner 50 side of the adhesive label base sheet 56. The adhesive label base sheet 56 is held between the rotary cutting machine 58 and the cylindrical seat 60, and the adhesive label base sheet 56 is moved while rotating the rotary cutting machine 58 and the cylindrical seat 60. The label substrate 54 with the adhesive 52 is punched by the cutting teeth 67 of the rotary cutting machine 58, and single labels 62 are successively formed from the label substrate 54 with the adhesive 52. After a number of single labels 62 are punched out from the label substrate 54 with the adhesive 52, the residual part after punching out the single labels 62 in the label substrate 54 is peeled from the paper liner 50 as a waste member 66 having holes 64 formed therein.

Conventionally, a number of single labels 62 are sequentially stuck (pseudo-adhered) onto the paper liner 50 at intervals through the adhesive 52. The paper liner 50 on which a number of single labels 62 are sequentially pseudo-adhered at intervals is wound around a core tube (not shown) and taken up in a roll shape (Patent Document 1). As the method of sequentially sticking a number of single labels 62 produced in FIG. 5 on the paper liner 50 at intervals, each manufacturer adopts its own unique method.

In Patent Document 1, since a number of labels are stuck on the paper liner one by one at intervals, the paper liner must be moved by the total length of the length of one label and the space between labels after one label is taken from the paper liner. Namely, the paper liner must be moved in a long distance every time one label is peeled. Therefore, in trying to stick a large amount of labels per unit time by use of the paper liner, the paper liner must be moved at high speed, and the high-speed movement of the paper liner requires a complicated and enlarged apparatus, resulting in an increased cost. Further, since the paper liner from which the labels are peeled must be wound up, the whole apparatus is inevitably increased in size due to the necessity of a space for winding up the paper liner. When the diameter of the wound paper liner becomes a fixed size or more, an operation for removing the wound paper liner by stopping the apparatus once is absolutely needed, and a continuous operation cannot be performed. Moreover, since the release agent layer is provided on one side of the paper liner, incineration cost of industrial waste for disposal of the paper liner or recycling cost for regeneration treatment thereof is also needed. Additionally, the incineration of the paper liner generates carbon dioxide.

If the use of the paper liner for sticking the labels is avoided, not only a reduction in cost by omission of the paper liner but also the continuous operation of the apparatus can be attained, and the generation of carbon dioxide by the incineration of the paper liner can be also eliminated. Further, the disadvantage of the necessity of the incineration cost as industrial waste in the disposal of the paper liner with the release agent applied to one side can be also eliminated. When the regeneration treatment is performed, the recycling cost for the regeneration treatment is needed, and this recycling cost can be higher than the incineration cost in some cases. Therefore, linerless labels using no paper liner (in which single labels are partially adhered to each other in sequence) are conventionally provided (Patent Document 2 and Patent Document 3).

FIG. 6 is a perspective view of a linerless label using no paper liner as described in Patent Document 2 or Patent Document 3, wherein a label strip-shaped body (linerless label strip-shaped body) 68 is formed by sequentially overlapping a number of single labels 62 formed in FIG. 5 with slight shift, and the label strip-shaped body 68 is wound around a core 70. In the label strip-shaped body 68 formed by sequentially overlapping and connecting the single labels 62, the single labels 62 are peeled therefrom one by one and stuck onto an adherend.

CITATION LIST

Patent Document

Patent Document 1: JP 1998(H10)-324319 A
Patent Document 2: JP No. 3205804
Patent Document 3: PCT/JP2010/50135

SUMMARY OF THE INVENTION

Problem to be Solved by the Invention

Conventionally, when a number of single labels are produced, as shown in FIG. 5, the adhesive label base sheet 56 composed of two members, or the paper liner 50 having the release agent applied to the surface and the label substrate 54 having the adhesive 52 applied to the reverse side, is used. After a number of single labels 62 are punched out from the label substrate 54 with the adhesive 52, both the label substrate 54 with the adhesive 52 and the paper liner 50 are uneconomically disposed as disused materials. Further, when the single labels 62 are half-punched out from the adhesive label base sheet 56 composed of the two members, the seat 60 must be used on the opposite side of the rotary cutting machine 58, and the use of the seat 60 leads to a cost increase.

The present invention has an object to provide a label production method capable of significantly reducing production costs by producing a number of single labels using only one member, as against the conventional formation of single labels using two members.

Means for Solving Problem

A label production method according to the present invention for producing labels using one type of label substrate, includes simultaneously passing, through a laminating device, a preceding label substrate passing through the laminating device for the second time and a succeeding label substrate passing through the laminating device for the first time, pseudo-adhering the preceding label substrate to the succeeding label substrate by the laminating device with a release agent applied to one of the preceding and succeeding label substrates and an adhesive applied to the other of the preceding and succeeding label substrates being joined together by the simultaneous passing through the laminating device of the preceding label substrate and the succeeding label substrate, and punching out a single label from the preceding label substrate by a cutting tooth of a punching device in the pseudo-adhered state while using the succeeding label substrate as a seat in the punching of the preceding label substrate. The present invention, further includes separating, subsequent to the punching out the single label from the preceding label substrate by the cutting tooth of the punching device, the preceding label substrate from which the single label is punched out from the succeeding label substrate by a substrate separation section, moving, subsequent to the separating the preceding label substrate, the succeeding label substrate while maintaining a state in which the punched single label is pseudo-adhered thereon, and separating, subsequent to the moving the succeeding label substrate, reversing section the single label from the succeeding label substrate while reversing the succeeding label substrate by a reversing section. The present invention further includes applying the adhesive to one surface of the label substrate by an adhesive applicator before the label substrate reaches the laminating device for the second time on a downstream side of a position of the reversing section. The present invention further includes punching, when biting traces are formed on the succeeding label substrate by the cutting tooth of the punching device in the punching out the single label from the preceding label substrate by the cutting tooth of the punching device, the preceding label substrate while adjusting the position of the cutting tooth of the punching device to the position of the biting traces formed in the preceding label substrate. In the present invention, the release agent is applied to one surface of the succeeding label substrate before it reaches the laminating device. In the present invention, the adhesive is applied to a surface to be joined to the succeeding label substrate in the preceding label substrate.

Effect of the Invention

According to the label production method of the present invention, one member (label substrate) is used, and the one member is passed through a punching position twice, whereby the one member is used as a seat in the first passing, and single labels are punched out from the one member in the second passing. The preceding label substrate and the succeeding label substrate are superposed double and laid in a pseudo-adhered state by the adhesive before the single labels are punched out from the label substrate, and the label substrate on the preceding side is punched by the cutting tooth of the punching device while using the label substrate on the succeeding side as the seat in the punching.

Since adhesive-applied labels are produced using only one member (label substrate), material costs can be reduced by half, compared with the conventional production method using the adhesive label base sheet composed of two members, and a significant reduction in cost can be attained. Since the label substrate on the succeeding side can be used as the seat when the single labels are punched out from the label substrate on the preceding side, the conventionally-used seat can be omitted to reduce the cost of the production apparatus.

REFERENCE SIGNS LIST

Figure 1:
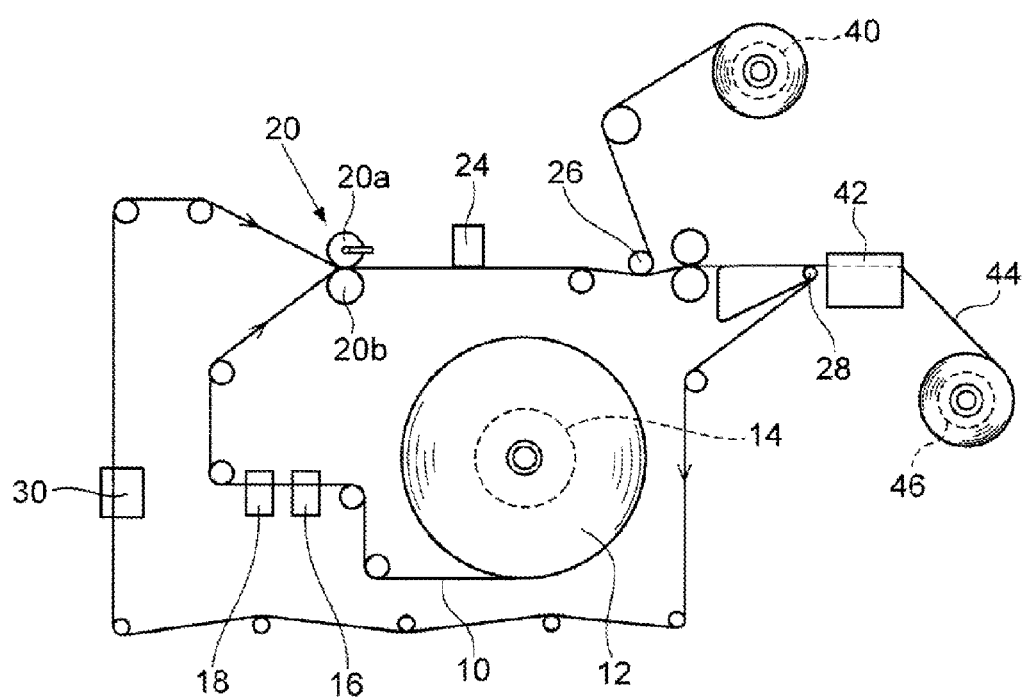
FIG. 1 is a structural view showing one example of a label production apparatus used for a label production method according to the present invention.

10 Label substrate
10a First label substrate
10b Second label substrate
20 Laminating device
22 Cutting tooth
24 Punching device
26 Substrate separation device
28 Reversing device
30 Adhesive applicator
32 Single label
40 Waste take-up device

BEST MODE FOR CARRYING OUT THE INVENTION

The present invention is then described in reference to the drawings. One example of an apparatus for producing labels according to the present invention is shown in FIG. 1. In the present invention, labels to be stuck to adherends such as bottles are produced using only one member (label substrate 10). The label substrate 10 is attached to a paper feeding device 14 (shown by the dotted line) as a roll body 12 formed by winding in a roll shape, and the label substrate 10 is fed from the roll body 12. The label substrate 10 fed out of the roll body 12 is moved through a printer 16 for printing and a release agent applicator 18. The label substrate 10 can be passed through either of the printer 16 and the release agent applicator 18 first. The label substrate 10 of the roll body 12 may be preliminarily subjected to printing and application of release agent, and the printer 16 and the release agent applicator 18 can be omitted in such case.

The label substrate 10 drawn from the paper feeding device 14 is then passed through a laminating device 20. The label substrate 10 passed through the laminating device 20 is set to pass through the laminating device 20 again after circulating once. Namely, the label substrate 10 is passed through the laminating device 20 twice. On this occasion, the preceding label substrate 10 (that passes through the laminating device 20 for the second time after passing through the laminating device 20 once) is superposed on the succeeding label substrate 10 (that passes through the laminating device 20 once (for the first time)) by the laminating device 20, and passed through the laminating device 20 simultaneously therewith. Preferably, an adhesive is applied to one surface (the side contacting with the first label substrate 10) of the preceding label substrate 10 by an adhesive applicator 30 to be described later, and the adhesive side of the preceding label substrate 10 is pseudo-adhered to the release agent side of the succeeding label substrate 10 by the adhesive. Although the adhesive may be applied to the label substrate 10 passing through the laminating device 20 for the first time, the adhesive is preferably applied to the label substrate 10 passing through the laminating device 20 for the second time, from the point of maintaining the tackiness of the adhesive.

The laminating device 20 is composed of, for example, a pair of rollers 20a, 20b, one roller 20a being movable toward the other roller 20b, and the holding pressure of the preceding label substrate 10 and the succeeding label substrate 10 can be adjusted by the pair of rollers 20a, 20b. The laminating device 20 is not limited to the pair of rollers 20a, 20b.

The two label substrates (the preceding label substrate 10 and the succeeding label substrate 10) which are pseudo-adhered together by the laminating device 20 are passed through the position of a punching device 24 provided with a cutting tooth 22 (a device for punching out single labels 32 from the preceding label substrate 10), which is located on the downstream side. In the punching device 24, only the preceding label substrate 10 passing for the second time is punched, and the succeeding label substrate 10 passing for the first time is never punched. The two label substrates (the preceding label substrate 10 and the succeeding label substrate 10) which are pseudo-adhered via the punching device 24 then reach the position of a substrate separation section 26. The preceding label substrate 10 from which single labels 32 are punched out is separated from the succeeding label substrate 10 by the substrate separation section 26. The succeeding label substrate 10 separated from the preceding label substrate 10 by the substrate separation section 26 then reaches the position of a reversing section 28 with the single labels 32 being adhered thereon. As the substrate separation section 26 or the reversing section 28, for example, a roll is adopted, but not limited to. The label substrate 10 passed through the laminating device 20 for the first time at the position of the reversing section 28 is reversed at a sharp angle. On this occasion, the single labels 32 are removed from the succeeding label substrate 10, and the succeeding label substrate 10 is moved from the position of the reversing section 28 toward the laminating device 20.

The label substrate 10 reversed by the reversing section 28 is routed through the adhesive applicator 30 in midstream, and the adhesive is applied to one surface of the label substrate 10 by the adhesive applicator 30. The adhesive applicator 30 may be disposed at any position on the downstream side of the printer 16 or the release agent applicator 18. However, for maintaining the tackiness to the label substrate 10, the adhesive applicator 30 is preferably disposed at a position before the preceding label substrate 10 passes through the laminating device 20 for the second time on the downstream side of the reversing section 28.

The label substrate 10 with the adhesive then reaches the laminating device 20 again (for the second time). The preceding label substrate 10 (the label substrate 10 that reaches the laminating device 20 for the second time) is set so that its adhesive-applied surface is joined to the release agent-applied surface of the succeeding label substrate 10 (the label substrate 10 that reaches the laminating device 20 for the first time). The preceding label substrate 10 and the succeeding label substrate 10 passed through the laminating device 20 are pseudo-adhered together through the adhesive-applied surface and the release agent-applied surface. The pseudo-adhered two label substrates 10 (the preceding label substrate 10 and the succeeding label substrate 10) are then moved toward the punching device 24.

In FIG. 1 to FIG. 4, the succeeding label substrate 10 reaching the laminating device 20 for the first time is shown as the lower side, and the preceding label substrate 10 reaching the laminating device 20 for the second time is shown as the upper side. In the succeeding label substrate 10 (the label substrate 10 reaching the laminating device 20 for the first time), the portion from the position of the laminating device 20 to the position of the reversing section 28 is referred to as "first label substrate 10a", and in the preceding label substrate 10 (the label substrate 10 reaching the laminating device for the second time), the portion from the position of the laminating device 20 to the position of the substrate separation section 26 is referred to as "second label substrate 10b".

Figure 2:
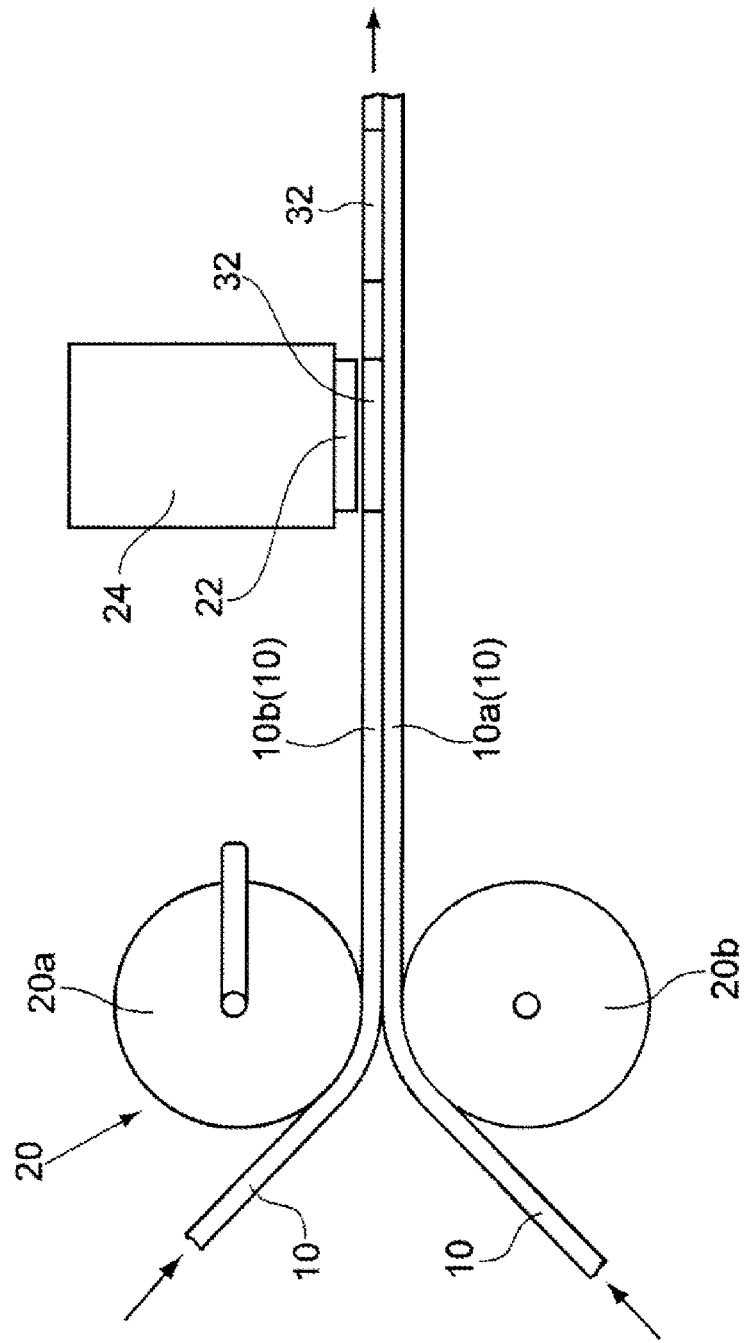
FIG. 2 is a configuration diagram showing a state in which single labels are punched out from the preceding label substrate with the preceding label substrate being superposed on the succeeding label substrate.
Figure 5:
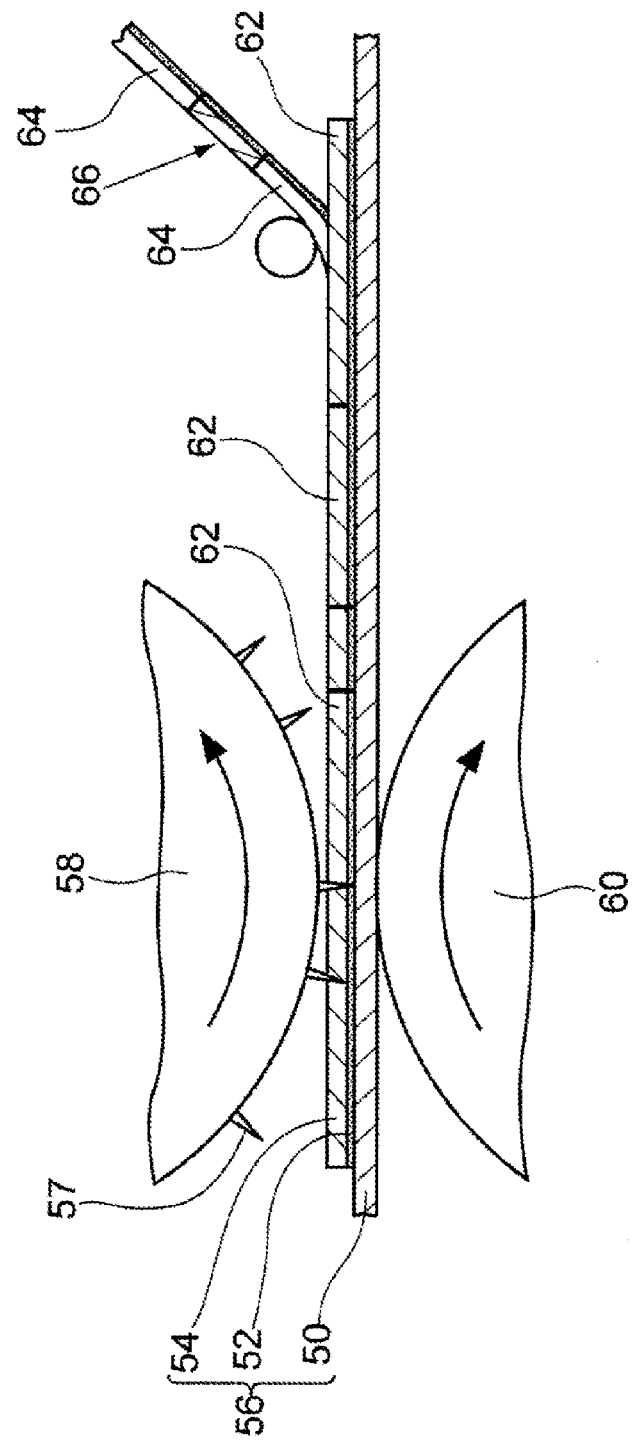
FIG. 5 is a configuration diagram showing a conventionally known method for producing single labels from an adhesive label base sheet.

As shown in FIG. 2, the first label substrate 10a and the second label substrate 10b are superposed at the position of the laminating device 20, and punching is performed on the second label substrate 10b by the punching device 24 to punch out a single label 32 from the second label substrate 10b. In the punching by the punching device 24, the cutting tooth 22 of the punching device 24 is caused to penetrate through the thickness of the second label substrate 10b to punch out the single label 32 from the second label substrate 10b. The first label substrate 10a pseudo-adhered to the second label substrate 10b functions as a punching seat for punching out the single label 32 from the second label substrate 10b. Furthermore, the punching device 24 may be the rotary cutting machine shown in FIG. 5. When the single label 32 is punched out from the second label substrate 10b by the punching device 24, the cutting tooth 22 of the punching device 24 never bites into the surface of the first label substrate 10a in principle.

The first label substrate 10a that has functioned as the seat is then circulated around the apparatus once and reaches the laminating device 20 for the second time. Single labels 32 are successively punched out from the second label substrate 10b that reached the laminating device 20 by the punching device 24. Although the cutting tooth 22 of the punching device 24 never bites into the surface of the first label substrate 10a in principle, depending on the type of device, biting traces of the cutting tooth 22 can be formed on the surface of the first label substrate 10a possibly. In that case, the biting traces formed in the second label substrate 10b that reached the downstream side of the laminating device 20 are set to be located at a position corresponding to the punching position of the single labels 32 by the cutting tooth 22 of the punching device 24. Accordingly, even if the biting traces by the cutting tooth 22 of the punching device 24 are formed in the second label substrate 10b, no biting traces are left on the punched single labels 32.

After the single labels 32 are punched out from the second label substrate 10b by the punching device 24, the second label substrate 10b and the first label substrate 10a in the pseudo-adhered state are moved toward the downstream side, and the second label substrate 10b from which the single labels 32 are punched out is separated from the first label substrate 10a at the position of the substrate separation section 26.

Figure 3:
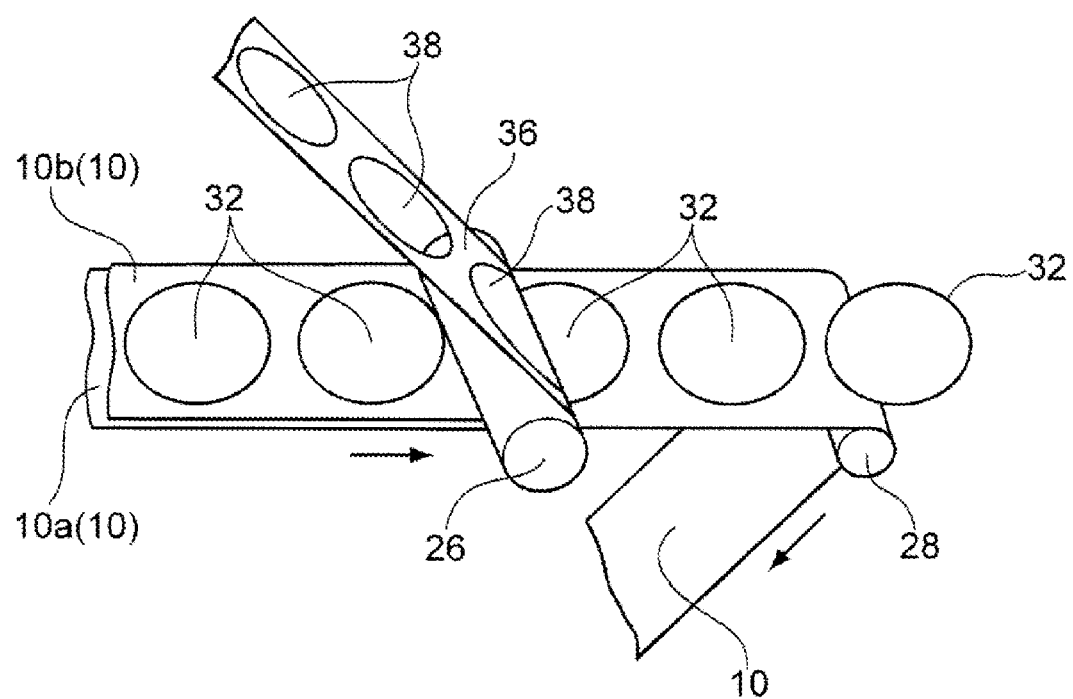
FIG. 3 is a perspective view showing a state in which a waste substrate after punching the single labels from the preceding label is separated from the succeeding label substrate.
Figure 4:
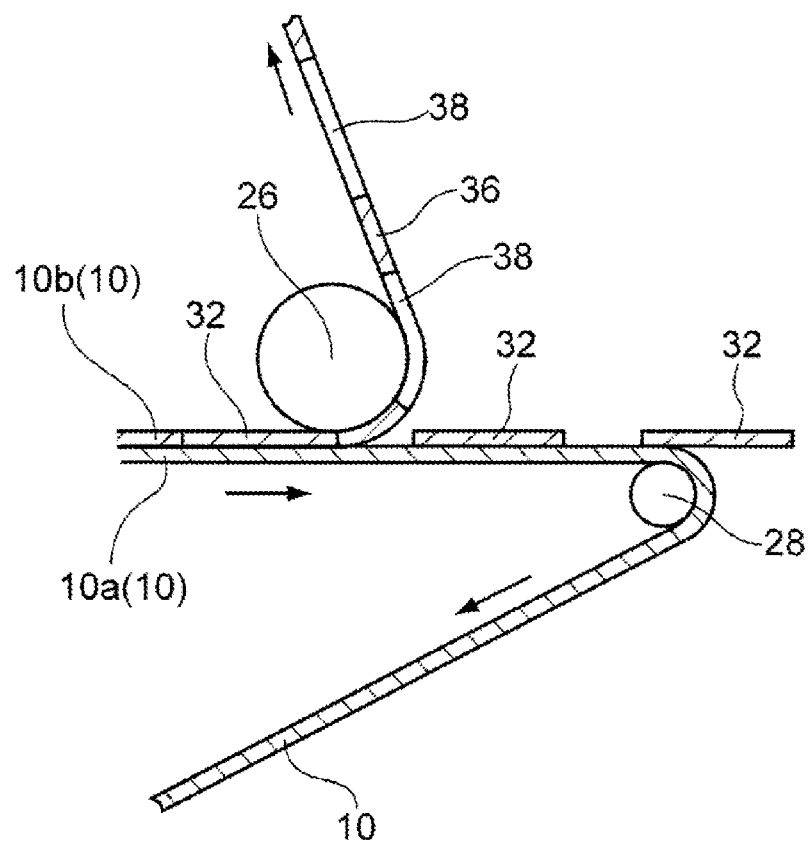
FIG. 4 is a cross-sectional view showing a state in which the punched single labels placed on the succeeding label substrate are separated from the succeeding label substrate.

As shown in FIG. 3 and FIG. 4, the second label substrate 10b is reversed by the substrate separation section 26, and becomes a waste substrate 36 after punching out the single labels 32 from the second label substrate 10b (the label substrate 10) (the upstream side of the position of the substrate separation section 26 is the second label substrate 10b, and the downstream side of the position of the substrate separation section 26 is the waste substrate 36). The waste substrate 36 has intermittent holes 38 sequentially formed therein (holes formed by punching out the single labels 32). The waste substrate 36 is taken up in a roll shape by a waste take-up device 40 (shown by the dotted line).

Figure 6:
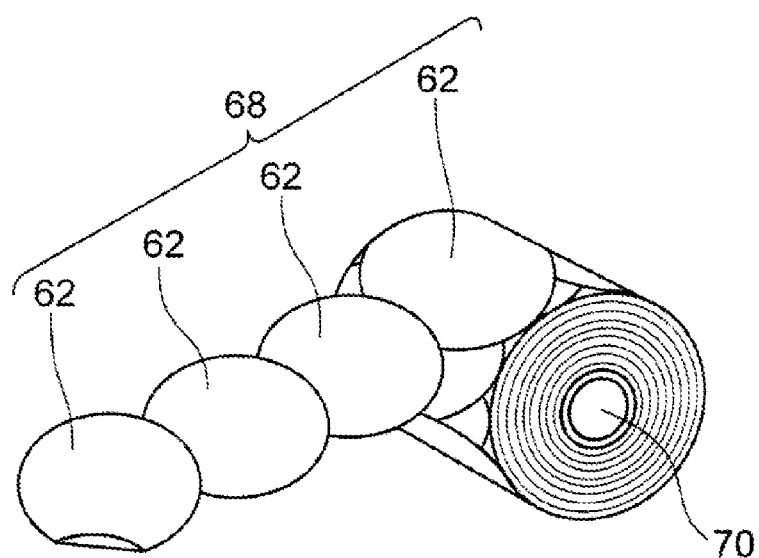
FIG. 6 is a perspective view showing a conventionally known linerless label in which single labels are overlapped.

To the first label substrate 10a from which the second label substrate 10b (the waste substrate 36) is separated at the position of the substrate separation section 26, the single labels 32 are intermittently pseudo-adhered in sequence, and the first label substrate 10a with the single labels 32 pseudo-adhered thereto is reversed at a sharp angle by the reversing section 28 as shown in FIG. 1, FIG. 3 and FIG. 4. The single labels 32 pseudo-adhered to the first label substrate 10a are inertially moved in the same direction as the direction leading to the position of the reversing section 28 by the first label substrate 10a reversed at the position of the reversing section 28, and separated from the first label substrate 10a. The single labels 32 separated from the first label substrate 10a are guided to a label connecting device 42, and formed into a serial label strip-shaped body 44 (in which the single labels 32 are continuously connected, or which is similar to the label strip-shaped body 68 shown in FIG. 6). The label strip-shaped body 44 is wound up in a roll shape by a linerless label winding device 46 (shown by the dotted line). Furthermore, each connecting interval of the labels 32 in the label strip-shaped body 44 is closer than the connecting interval in the label strip-shaped body 68 shown in FIG. 6.

In the label production method of the present invention, the single labels 32 punched out by the punching device 24 are sequentially carried to the position of the reversing section 28 in the pseudo-adhered state to the first label substrate 10a, and sequentially separated from the first label substrate 10a (label substrate 10) at the position of the reversing section 28. In this way, the single labels 32 punched out by the punching device 24 are sequentially carried to a predetermined position. Since the punched single labels 32 can be carried to the predetermined position by the first label substrate 10a (the label substrate 10) and then separated therefrom, the label strip-shaped body 44 (linerless label) can be easily formed by partially adhering the single labels 32 to each other in sequence. Although the linerless label is formed, in the conventional punching of single labels, by collecting and neatly aligning punched single labels and then partially adhering the single labels to each other in sequence, the label strip-shaped body 44 (linerless label) made from single labels 32 can be easily formed, in the label production method of the present invention, by a sequential operation of punching out the single labels 32.

The label production method of the present invention can be applied to both the production of labels to be stuck to a paper liner, and the production of the linerless label needing no paper liner (Patent Document 2). In the production of labels to be stuck on the paper liner, single labels 32 fed one by one at the position of the reversing section 28 are stuck onto the paper liner at intervals. On the other hand, in the linerless label needing no paper liner, the label strip-shaped body 44 (linerless label) is formed by sequentially connecting the single labels 32 fed one by one at the position of the reversing section 28 by the label connecting device 42. In the production of the linerless label needing no paper liner, a transparent synthetic resin film is used for the label substrate 10, and as the material of the transparent synthetic resin film, for example, polyester (including PET (polyethylene terephthalate), PP (polypropylene), PS (polystyrene), PVC (polyvinyl chloride), nylon and the like are preferably used.

In the label production method of the present invention for producing adhesive-applied labels using one member (single sheet), the member costs can be reduced, compared with the conventional method using an adhesive label base sheet composed of two members (a label substrate and a backing paper or paper liner). The labels can be produced using one member since the one member is passed through a punching position twice, and the succeeding label substrate is used as the seat in the punching of the preceding label substrate.

Although the adhesive is applied to the surface to be joined to the succeeding label substrate in the preceding label substrate in the above description, the adhesive agent and the release agent may be applied respectively to any sides of the label substrate 10 respectively.

The invention claimed is:

1. A label production method for producing labels using one type of label substrate, comprising:
   simultaneously passing, through a laminating device, a preceding label substrate passing through the laminating device for a second time and a succeeding label substrate passing through the laminating device for a first time;
   pseudo-adhering the preceding label substrate to the succeeding label substrate by the laminating device with a release agent applied to one of the preceding and succeeding label substrates and an adhesive applied to the other of the preceding and succeeding label substrates being joined together by the simultaneous passing through the laminating device of the preceding label substrate and the succeeding label substrate; and
   punching out a single label from the preceding label substrate by a cutting tooth of a punching device in the pseudo-adhered state while using the succeeding label substrate as a seat in the punching of the preceding label substrate.

2. The label production method according to claim 1, further comprising:
   separating, subsequent to the punching out the single label from the preceding label substrate by the cutting tooth of the punching device, the preceding label substrate from which the single label is punched out from the succeeding label substrate by a substrate separation section;
   moving, subsequent to the separating the preceding label substrate, the succeeding label substrate while maintaining a state in which the punched single label is pseudo-adhered thereon; and
   separating, subsequent to the moving the succeeding label substrate, reversing section the single label from the succeeding label substrate while reversing the succeeding label substrate by a reversing section.

3. The label production method according to claim 2, further comprising applying the adhesive to one surface of the label substrate by an adhesive applicator before the label substrate reaches the laminating device for the second time on a downstream side of a position of the reversing section.

4. The label production method according to claim 1, further comprising punching, when biting traces are formed on the succeeding label substrate by the cutting tooth of the punching device in the punching out the single label from the preceding label substrate by the cutting tooth of the punching device, the preceding label substrate while adjusting the position of the cutting tooth of the punching device to the position of the biting traces formed in the preceding label substrate.

5. The label production method according to claim 1, wherein the release agent is applied to one surface of the succeeding label substrate before it reaches the laminating device.

6. The label production method according to claim 1, wherein the adhesive is applied to a surface to be joined to the succeeding label substrate in the preceding label substrate.

7. The label production method according to claim 2, further comprising punching, when biting traces are formed on the succeeding label substrate by the cutting tooth of the punching device in the punching out the single label from the preceding label substrate by the cutting tooth of the punching device, the preceding label substrate while adjusting the position of the cutting tooth of the punching device to the position of the biting traces formed in the preceding label substrate.

8. The label production method according to claim 3, further comprising punching, when biting traces are formed on the succeeding label substrate by the cutting tooth of the punching device in the punching out the single label from the preceding label substrate by the cutting tooth of the punching device, the preceding label substrate while adjusting the position of the cutting tooth of the punching device to the position of the biting traces formed in the preceding label substrate.

\* \* \* \* \*